United States Patent [19]

Hennrich et al.

[11] Patent Number: 4,897,323

[45] Date of Patent: Jan. 30, 1990

[54] HIGH TEMPERATURE DISCHARGEABLE GALVANIC PRIMARY ELEMENT HAVING ALKALINE ELECTROLYTE

[75] Inventors: Rolf Hennrich; Heinz-Werner Nientiedt, both of Ellwangen, Fed. Rep. of Germany

[73] Assignee: Varta Batterie Aktiengesellschaft, Hanover, Fed. Rep. of Germany

[21] Appl. No.: 175,221

[22] Filed: Mar. 30, 1988

[30] Foreign Application Priority Data

May 2, 1987 [DE] Fed. Rep. of Germany ....... 3714654

[51] Int. Cl.$^4$ ............................................. H01M 6/10
[52] U.S. Cl. ...................................... 429/94; 429/222
[58] Field of Search ................................. 429/94, 222

[56] References Cited

U.S. PATENT DOCUMENTS

| | | | |
|---|---|---|---|
| 3,257,238 | 6/1966 | Andre | 429/94 |
| 3,945,847 | 3/1976 | Kordesch et al. | 429/222 |
| 4,185,144 | 1/1980 | Ames et al. | 429/222 |
| 4,650,680 | 3/1987 | Brenner et al. | 429/94 |

FOREIGN PATENT DOCUMENTS 0209067 12/1983 Japan ...................................... 429/94

Primary Examiner—Donald L. Walton
Attorney, Agent, or Firm—Weiser & Stapler

[57] ABSTRACT

A primary element is provided which is dischargeable at high temperatures comprising an alkaline electrolyte in a metallic annular cylindrical housing which encloses in inwardly directed concentric order: an outer positive silver oxide or manganese dioxide electrode in the form of a pressed powder cylinder and an inner negative electrode comprising a concentrically wound cadmium electrode wherein said negative electrode is separated from said positive electrode by a separator interposed therebetween. In storage and testing it has been shown that cells produced in accordance with the present invention may be kept at temperatures of the order of 200° C. for over six weeks without any loss of operability.

18 Claims, 1 Drawing Sheet

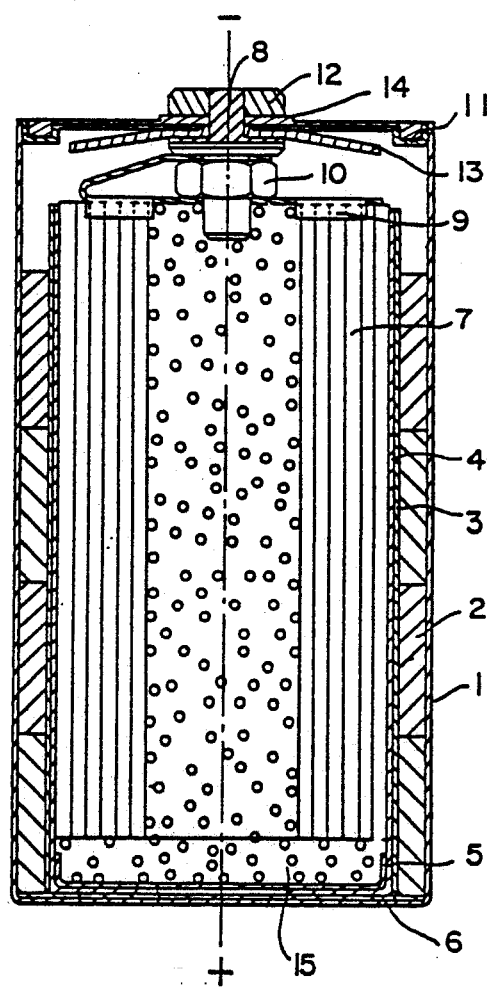

HIGH TEMPERATURE DISCHARGEABLE GALVANIC PRIMARY ELEMENT HAVING ALKALINE ELECTROLYTE

FIELD OF THE INVENTION

The invention concerns a primary element which is dischargeable at high temperature comprising an alkaline electrolyte in a metal housing of the annular cylindrical type.

BACKGROUND OF THE INVENTION

An element of the general type subject of the present invention is disclosed in Brenner et al, U.S. Pat. No. 4,650,680. Annular cylindrical cells of this type principally, because of the performance qualities of alkaline silver oxide/zinc systems are particularly desirable for probes and assistance systems utilized in the exploration of earth resources. In such explorations successively deeper earth layers must be explored and with increasing depth, the correspondingly increasing temperature becomes the deciding limiting factor in the components in the construction of the battery. It is known for example, that manganese oxide cells supplied with aqueous potassium hydroxide remain fully functional above 100° C. in place of the Leclanche electrolytes used in conventional primary elements. A further advance having the goal of operating at the higher temperatures while minimizing the corrosive attack of the aforesaid electrolytes on the inner portions of the cell, was directed, in the aforesaid patent to the selection of resistance elements for the separator. The combination of ceramic paper and ion exchange membrane was found to be very useful.

Notwithstanding the provision of highly inert separators, alkaline manganese and silver oxide annular cylindrical cells having negative zinc electrodes, reach their operative limit at around 160° C. The reason lies less in the qualitative inferiority of the electrochemically inactive cell components than the occurrence of explosions which were already noted in numerous cells on the third day during storage tests at 160° C. The reason for these explosions is the substantial generation of gas at the zinc electrode, which occurs because the hydrogen over potential at the zinc drops with increasing temperature, which in turn give rise to an exponentially increasing rate of generation of gas.

It would be desirable to provide an alkaline primary element basically constructed in accordance with the known principles of construction of annular cylindrical cells and provided with an externally located positive electrode, which is modified in such a manner that it may be reliably utilized in the higher temperature ranges mentioned above without the possibility of excess gas generation.

SUMMARY OF THE INVENTION

By means of this invention there is provided a novel primary element which is dischargeable at high temperatures comprising an alkaline electrolyte in a metallic annular cylindrical housing enclosing, in inwardly directed concentric order:

(a) an outer positive silver oxide or manganese dioxide electrode in the form of at least one pressed powder cylinder and (b) an inner negative electrode comprising a concentrically wound cadmium electrode, wherein said negative electrode is separated from said positive electrode by a separator interposed therebetween.

It has been found desirable to construct the electrodes in a concentric configuration wherein the outer ring cylinder, which comprises the positive electrode, is made of compacted silver oxide or manganese oxide powders and the inner space, which is separated from the positive electrode by a separator comprises a coiled sheet cadmium electrode. It has been found desirable to produce the cadmium electrode in accordance with the disclosure of DE-OS No. 2,822,821 wherein cadmium is deposited by cathodic deposition from a cadmium salt solution upon a metal carrier band which is then designated as an electrodeposited electrode.

BRIEF DESCRIPTION OF THE DRAWING

The drawing shows a cross-sectional elevational view of an element of the present invention.

DETAILED DESCRIPTION OF THE DRAWINGS

As shown in FIG. 1, the device of the present invention comprises an annular cylindrical metallic housing cup 1. Within this housing are located cathode rings 2 which serve as the positive electrode, made of compacted silver oxide and/or magnesium oxide powders which, if desired, further comprise a conductive material such as carbon. Internally of this annular cylinder and in contact therewith is provided a separator comprising one or more layers of thin sheets and/or fiber layers suitably comprising an outer lattice of PTFE 3 and an inner, sleeve formed, ion exchange membrane 4. The base of this sleeve is strengthened by an insulating inlay 5 also made of PTFE. As ion exchange membranes there may be utilized membranes such as radiation cross-linked polyethylene/polypropylene sheets such as those sold under the trade name of Permion by RAI Research Corporation, of Long Island City, N.Y. Also suitable are equivalent sheets of Nafion, (tetrafluorethylene/perfluorosulfonyl ethoxy vinyl ether copolymer made by E.I. duPont de Nemours of Wilmington, Delaware). Such membranes are merely set forth as examples. It is possible to use other separators as long as they are not negatively effected by the operating temperatures.

Yet another insulating layer 6 separates all of the internal components of the cell from the metal base of the outer metallic cup 1. The internal space remaining is substantially occupied by the coiled cadmium electrode 7 said coil comprising a metallic carrier band of nickel, nickel/steel, silver or copper coated as aforesaid by cadmium, suitably by electrodeposition.

The negative conductor is provided by rod 8 preferably a stainless steel rod which is affixed to contact disc 9 with nut 10. If desired this connection can also be welded or riveted. The contact sheet 9 is welded to and substantially encloses the top edges of the coil 7. A lid 11 closes the upper opening of metallic cup 1, the pole rod 8 passes through an opening in the said lid 11 to which it is attached by rivet ring nut 12 to form the negative pole of the cell. To ensure that there is no electrical contact between the pole 8 and nut 12 on the one hand and the lid 11 on the other, there are provided sealing, suitably insulating, means 13 between the upper bottom surface and the vertical side surfaces of pole 8 and lid 11 and insulating disc 14 located between ring 12 and lid 11, both 13 and 12 being suitably of PTFE. Any other alkali and high temperature proof synthetic material such as polyether ketones may be utilized.

Electrolyte 15 comprises a highly concentrated solution of aqueous alkali, suitably aqueous potassium hydroxide but sodium hydroxide may also be used. In the preferred embodiment the lid 11 is hermetically sealed to the outer metallic housing 1 by means of laser welding.

A primary element constructed as above is operable at substantially elevated temperatures suitably 200° C. and more, since under the given conditions no hydrogen is generated. The internal pressure of the cell is determined by the vapor pressure of the electrolyte for example, 6 bar at 200° C.

The advantages of these cells in comparison to the prior art alkaline cylindrical cells utilizing the silver oxide/zinc or manganese dioxide/zinc systems are readily apparent.

In storage testing it has been shown that cells produced in accordance with the present invention may be kept at temperatures of the order of 200° C. for over six weeks without any loss of operability. In contrast thereto, commercially available alkaline high temperature cells of the silver oxide/zinc type suffered from explosions after a lapse of only 5 days at 163° C. since at this point, the amount of hydrogen generated exceeded the retentive capacity of the cell.

We claim:

1. A primary element which is operable at substantially elevated temperatures without the generation of hydrogen gas and risk of hydrogen gas explosion comprising an alkaline electrolyte in a metallic annular cylindrical and hermetically sealed housing enclosing end inwardly directed concentric order:
    (a) an outer positive electrode consisting essentially of silver oxide or manganese dioxide in the form of at least one pressed powder cylinder:
    (b) an inner coiled negative electrode consisting essentially of cadmium, which electrode is fully enclosed concentrically within the confines of the positive electrode and not in contact with the positive electrode and
    (c) a separator interposed between the positive and negative electrodes.

2. An element in accordance with claim 1 wherein said inner negative electrode is coated with an electrodeposited layer of cadmium upon a metallic sheet carrier.

3. An element in accordance with claim 2 wherein the carrier is a nickel/steel, silver or copper carrier.

4. An element in accordance with claim 2 wherein the carrier is a nickel sheet carrier.

5. An element in accordance with claim 1 wherein said separator comprises at least two layers, the outer layer being a PTFE lattice and the inner layer being an ion exchange membrane.

6. An element in accordance with claim 2 wherein said separator at least two layer, the outer layer being a PTFE lattice and the inner layer an ion exchange membrane.

7. An element in accordance with claim 3 wherein said separator comprises at least two layers, the outer layer being a PTFE lattice and the inner layer an exchange membrane.

8. An element in accordance with claim 4 wherein said separator comprises at least two layers, the outer layer being a PTFE lattice and the inner layer ion exchange membrane.

9. An element in accordance with claim 5 wherein the ion exchange membrane is a sleeve provided with an inner insulating insert of PTFE.

10. An element in accordance with claim 9 wherein the ion exchange membrane is a radiation cross-linked polyethylene/polypropylene copolymer.

11. An element in accordance with claim 9 wherein the ion exchange membrane is a radiation cross-linked tetrafluorethylene/perfluorosulfonyl ethoxy vinyl ether copolymer.

12. An element in accordance with claim 1 wherein the positive electrode is silver oxide.

13. An element in accordance with claim 1 wherein the positive electrode is a manganese dioxide.

14. An element in accordance with claim 1 wherein the electrolyte is concentrated aqueous potassium or sodium hydroxide.

15. An element in accordance with claim 14 wherein the electrolyte is concentrated aqueous potassium hydroxide.

16. An element in accordance with claim 1 wherein the outer housing comprises a sealed lid.

17. An element in accordance with claim 16 wherein the lid is a laser welded sealed lid.

18. An element in accordance with claim 16 wherein the negative conductor comprises a metal rod passing through said lid but electrically isolated therefrom.

* * * * *